United States Patent [19]
Aubry et al.

[11] Patent Number: 4,625,995
[45] Date of Patent: Dec. 2, 1986

[54] SUSPENSION WITH PIVOTABLE ARMS

[75] Inventors: Jacques Aubry, Cabries; Michel Bonfils, St. Cannat; Jean-Paul Merlet, Mimet, all of France

[73] Assignee: Societe Nationale Industrielle Aerospatiale, Paris, France

[21] Appl. No.: 708,528

[22] Filed: Mar. 5, 1985

[30] Foreign Application Priority Data

Mar. 8, 1984 [FR] France ............................. 84 03603

[51] Int. Cl.$^4$ ............................................. B60G 11/20
[52] U.S. Cl. ................................... 280/723; 280/700; 267/148
[58] Field of Search ............... 280/700, 689, 690, 695, 280/721, 723, 717; 267/148, 149, 81

[56] References Cited

U.S. PATENT DOCUMENTS 3,722,908  3/1973  Whitley ............................... 280/723
4,234,205 11/1980  Thiesce .............................. 280/723
4,291,895  9/1981  Wohrle et al. ...................... 280/723
4,488,736 12/1984  Aubry et al. ....................... 267/148
4,521,033  6/1985  Backhaus et al. .................. 280/700

Primary Examiner—Richard A. Bertsch
Attorney, Agent, or Firm—Fisher, Christen & Sabol

[57] ABSTRACT

Suspension for a two-sheeled undercarriage of a vehicle comprising two arms pivotable about an axis transversal to said vehicle, each arm carrying one wheel, and an assembly of tubes of axes parallel to said transversal axis and made of a composite material of fibers and synthetic material.

The suspension according to the invention is remarkable in that said assembly comprises a first tube integral with the vehicle chassis by each of its ends, and about which tube each arm can pivot, as well as two second tubes integral by each of their ends with one of said arms, said first tube and said second tubes being interconnected in their middle part.

10 Claims, 5 Drawing Figures

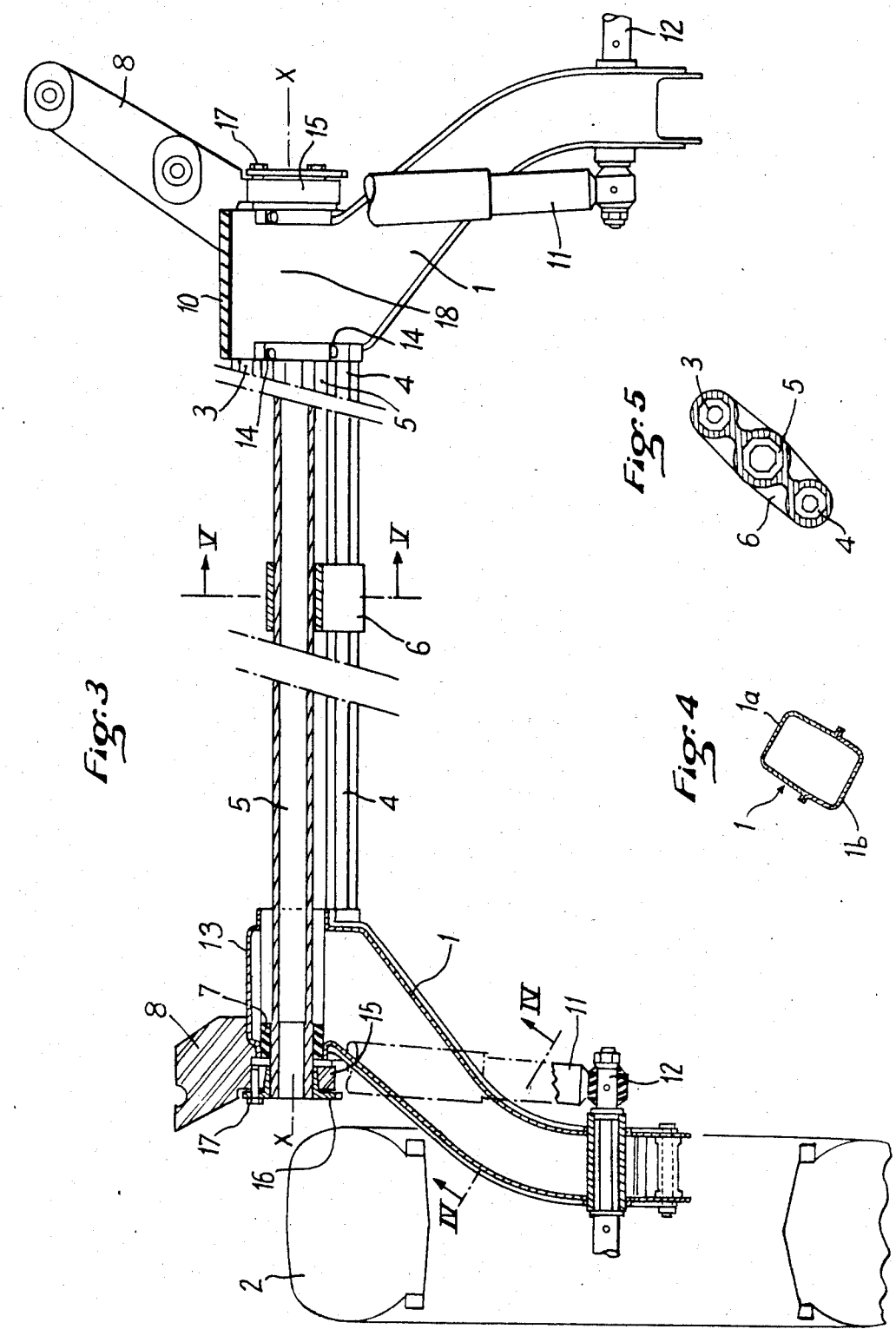

SUSPENSION WITH PIVOTABLE ARMS

The present invention relates to a suspension for a two-wheeled undercarriage of a vehicle, comprising two arms pivoting about an axis transversal to the vehicle, each arm carrying one of the wheels, and a set of tubes of axes parallel to said transverse axis and produced in a composite material of fibers and synthetic material. The suspension according to the invention is more particularly although not exclusively suitable for use as rear suspension of a motor-vehicle of the front-wheel drive type.

The suspension according to the invention is remarkable in that said assembly comprises a first tube integral with the vehicle chassis at each one of its ends, tube about which each arm can pivot, and at least two second tubes joined at each of their ends with one of said arms, said first tube and said second tubes being joined one to the other by their middle part.

It is thus obvious that the suspension is ensured, for each suspension arm, by the two halves of said interconnected second tubes and by the half of said first tube which is series-mounted with said two halves, said second tubes being subjected to twisting and bending stresses whereas said first tube is subjected to twisting stresses. It will also be noted that said second tubes joining together the two suspension arms give the anti-slant rigidity and that said second tubes form a girder for guiding the wheels in toe-in and camber.

The fact of producing said tubes in fibers-synthetic resin composite material enables the latter to reach mechanical properties which correspond to the functions that they fulfill and that could not be obtained with steel tubes of comparable dimensions and weight. It is possible according to the present invention to produce a suspension which, while remaining simple, is light, so that a gain over the overall weight of the vehicle is obtained, hence a reduction in its fuel consumption.

Preferably, said second tubes are identical and are arranged symmetrically with respect to said first tube.

According to an advantageous embodiment, in order to adequately distribute the guidance stiffnesses in toe-in and camber, the plane containing the three axes of said first and second tubes is inclined with respect to the vertical and said plane rises from the back towards the front of the vehicle.

The pivoting joint of said suspension arms on the ends of said first tube is advantageously achieved by way of elastomeric bearings which further permit longitudinal clearance and deflection for the wheels.

The said second tubes at least may have a polygonal cross-section and each of said suspension arms may be constituted by two shell members squeezing said second tubes between them to ensure interlocking of said tubes with said arms.

Preferably, the ends of said first tube are joined to fastening plates, which plates are also adapted to be joined to said chassis. Each suspension arm can comprise a hollow transverse sleeve, crossed through by the corresponding end of said first tube and on the periphery of which said second tubes are joined to the associated suspension arm.

Advantageously, each fastening plate comprises a wing member which is at least approximately vertical for the hinged connection of a shock absorber which is also connected to the associated suspension arm.

The present invention also relates to a tube assembly, in which the tubes are of parallel axes and are made of a composite material of fibers and synthetic material, said assembly being designed for the suspension of a two-wheeled undercarriage of a vehicle and comprising two arms pivoting about an axis X—X transverse to said vehicle, each arm carrying one of said wheels, said assembly being remarkable in that it comprises a first tube designed to be fastened to the vehicle chassis and to act as a shaft for two suspension arms, as well as at least two second tubes designed to be connected by each of their ends to one of said arms, said first tube and said second tubes being joined one to the other by their middle part.

The invention will be more readily understood on reading the following description with reference to the accompanying drawings, in which:

FIG. 3 shows, partly, a horizontal section along line III—III of FIG. 2, and partly, a plan view of the embodiment shown in FIG. 2.

FIGS. 4 and 5 are, respectively, cross-sections along lines IV—IV and V—V of FIG. 3.

Figure 1:
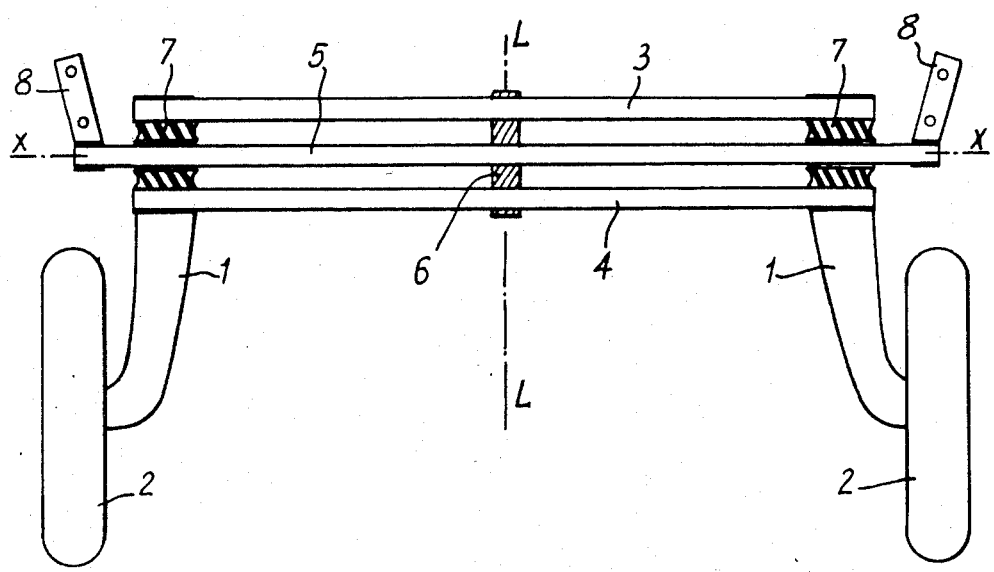
FIG. 1 is a diagrammatical plan view of a vehicle rear suspension, according to the invention.

The rear suspension according to the invention, such as illustrated in FIG. 1, is of the type called "with drawn wheels", namely that it comprises two suspension arms 1, mounted for pivoting by their front part on the vehicle chassis about an axis X—X and equipped with wheels 2 on their rear part. The suspension comprises two parallel bars 3 and 4, disposed transversely to the longitudinal axis L—L of the vehicle, and on which said suspension is mounted, said bars being subject to elastic deformations under twisting and bending stresses. Each one of bars 3 and 4 is joined, by its corresponding end, on one side to the left suspension arm 1, and on the other side, to the right suspension arm 1.

A bar 5 is disposed between bars 3 and 4, said bar 5 being parallel thereto and integral therewith in the middle thereof, owing to a median interlocking cross-member 6. Intermediate bar 5 rests (without being fastened) by its ends, on the two suspension arms 1, via bearings 7, such as elastomeric bearings for example. Said intermediate bar 5 is moreover fixed onto the vehicle chassis, also by its ends, via force pick-up fittings 8.

The axis of bar 5 coincides with the pivoting axis X—X of arms 1, so that said arms are pivotable about said bar.

It is therefore clear that, in the suspension according to the invention:

the vertical stiffness for the vertical oscillations of a suspension arm 1 is achieved by means of the set of two half-way bars 3 and 4 joined to said arm 1 and of half-way bar 5 joined to the chassis and mounted in series with the other two, bars 3 and 4 being subjected to bending and twisting stresses, whereas bar 5 is subjected to twisting stresses;

the counter-camber stiffness is achieved by way of the two bars 3 and 4 joining together the two suspension arms 1 and subjected to twisting and bending stresses in the vertical plane;

guidance of the undercarriage of wheels 2 in toe-in and camber is achieved by the bracing constituted of the two bars 3 and 4, subjected to bending stresses in the horizontal plane;

elastomeric bearings 7 ensure the longitudinal filtering of the oscillations of suspension arms 1.

As will be seen hereinafter, vertical damping can be achieved with any type of damping means.

Preferably, the three bars 3, 4 and 5 are constituted by tubes made of a composite material containing fibers (glass, carbon, boron or other fibers, or a mixture thereof), covered with synthetic resin, by any known method (filament winding, superposed braidings, weaving, etc. . . . ), permitting to obtain for said tubes high values of the ratio R/E , in which R is the breaking stress and E the elastic modulus.

As can be seen hereinafter, said tubes can have a polygonal outline. They can be fitted in by glueing, friction, mechanical means, fixing polygonal sections one into the other, etc. . . .

Figure 2:
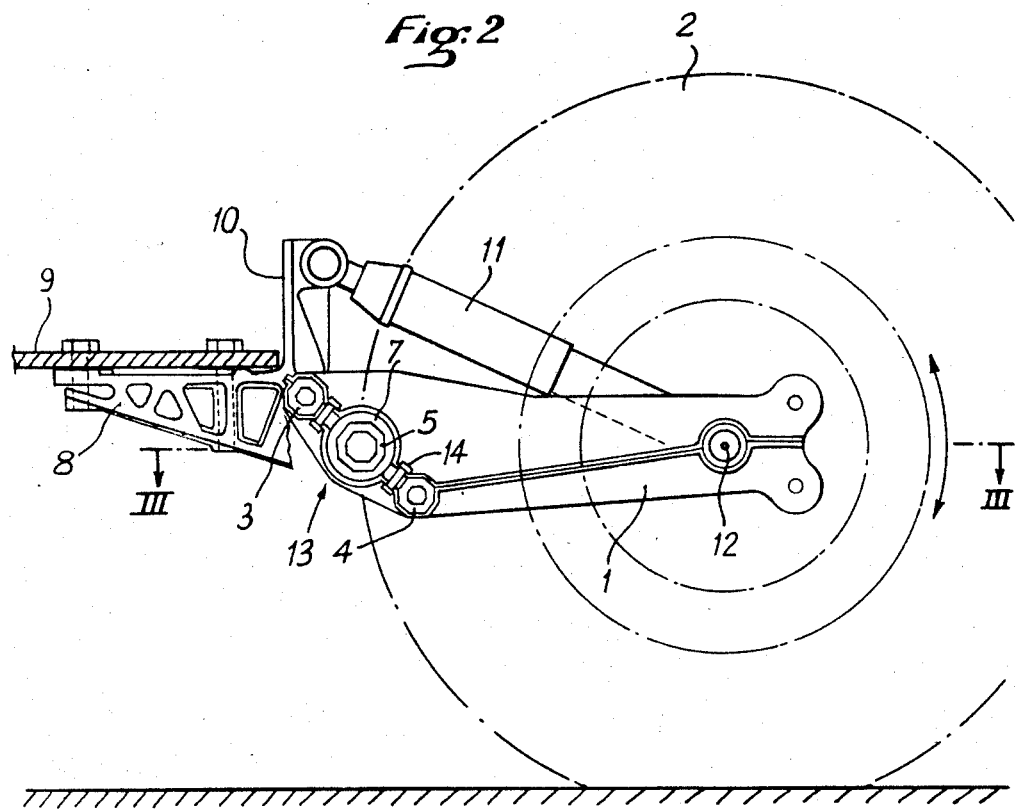
FIG. 2 is a side view of one advantageous embodiment of the rear suspension shown in FIG. 1.

FIG. 2 which, with FIGS. 3, 4 and 5 illustrates a practical embodiment of the suspension according to FIG. 1, shows the fastening of the attachment plates or force-picking up fittings 8 on the chassis 9 of the vehicle, and also that said fittings 8 comprise vertical arms 10, permitting to fix and articulate shock-absorbers 11, such as hydraulic shock-absorbers, which are also connected the the axles 12 of the wheels 2.

As illustrated in FIGS. 2, 3 and 4, the bars 3, 4 and 5 have a constant polygonal cross-section (octogonal in the drawings). They are made of strong fibers coated with hard-setting resin. Each arm 1 is constituted of two shells of folded sheet metal or of fibers and resin laminate, 1a and 1b, and comprises, at its front part, a sleeve 13 crossed through by the bar 5 and made integral on its periphery with bars 3 and 4, gripped and squeezed between said shells 1a and 1b by means of lock screws 14. The ends of the bar 5 which project out of the sleeve 13 are friction-connected to a force-picking up fitting 8. To this effect, each fitting 8 comprises a ring 15 gripping the corresponding end of the bar 5 and cooperating with a flange 16 and with lock screws 17 in order to lock said flange 16 on said end, by a wedge effect. The elastomeric bearings 7 are held between the shells 1a and 1b and ensure the support of the bar 5 through the sleeve 13.

The bars 3 and 4 are identical one to the other and are arranged symmetrically with respect to the bar 5. The plane containing the axes of bars 3, 4 and 5 is inclined with respect to the vertical and rises from the back towards the front of the vehicle, so as to rigidify the guidance of the wheels both in toe-in and in camber.

What is claimed is:

1. A suspension for two wheels of a vehicle, comprising:
   (a) a first tube transversely attached at opposite ends to said vehicle's chassis, wherein said first tube is a composite of fiber and synthetic resin;
   (b) a pair of arms rotatably mounted on opposite ends of said first tube, each of said arms carrying one of said wheels;
   (c) at least two mutually spaced second tubes in parallel and mutually spaced alignment with said first tube being each attached at opposite ends to said arms, said first and second tubes being interconnected at middle portions thereof, wherein said second tubes are each a composite of fiber and synthetic resins.

2. A suspension as claimed in claim 1, wherein said second tubes are identical and arranged symmetrically with respect to said first tube.

3. A suspension as claimed in claim 2, wherein the plane containing the three axes of said first and second tubes is inclined with respect to the vertical.

4. A suspension as claimed in claim 3, wherein said plane containing the three axes rises from the back towards the front of the vehicle.

5. A suspension as claimed in claim 1, wherein the articulation of said suspension arms on the ends of said first tube is achieved by means of elastomeric bearings.

6. A suspension as claimed in claim 1, in which at least said second tubes have a polygonal cross-section, wherein each of said suspension arms is constituted of two shells squeezing between them the said second tubes to achieve interconnection of said tubes with said arms.

7. A suspension as claimed in claim 1, wherein the ends of said first tube are joined to fastening plates adapted to be in turn fastened to said chassis.

8. A suspension as claimed in claim 7, wherein each fastening tab comprises a wing member which is at least approximately vertical for the hinged connection of a shock-absorber which is also connected to the associated suspension arm.

9. A suspension as claimed in claim 1, wherein each suspension arm comprises a hollow transversal sleeve crossed through by the corresponding end of said first tube and on the periphery of which the second tubes are connected to the associated suspension arm.

10. An assembly of tubes of parallel axes made in composite material of fibers and synthetic material, designed for the suspension of a two-wheeled undercarriage of a vehicle, comprising two arms pivotable about an axis transversal to said vehicle, each arm carrying one wheel, wherein said assembly comprises a first tube designed to be joined to the vehicle chassis and to act as a shaft for two suspension arms, and at least two mutually spaced second tubes, designed to be joined at each of their ends, with one of said arms, said first tube and said second tubes being interconnected in their middle part.

* * * * *